(12) United States Patent
Wang

(10) Patent No.: US 12,499,712 B2
(45) Date of Patent: Dec. 16, 2025

(54) INTERACTION METHOD AND APPARATUS, DEVICE AND READABLE MEDIUM

(71) Applicant: Beijing Bytedance Network Technology Co., Ltd., Beijing (CN)

(72) Inventor: Hongdan Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 393 days.

(21) Appl. No.: 18/005,812

(22) PCT Filed: Jul. 7, 2021

(86) PCT No.: PCT/CN2021/104899
§ 371 (c)(1),
(2) Date: Jan. 17, 2023

(87) PCT Pub. No.: WO2022/017181
PCT Pub. Date: Jan. 27, 2022

(65) Prior Publication Data
US 2023/0298384 A1    Sep. 21, 2023

(30) Foreign Application Priority Data

Jul. 24, 2020   (CN) .......................... 202010724931.1

(51) Int. Cl.
G06V 40/20  (2022.01)
G06F 3/04817  (2022.01)
G10H 1/00  (2006.01)

(52) U.S. Cl.
CPC .......... *G06V 40/28* (2022.01); *G06F 3/04817* (2013.01); *G10H 1/0008* (2013.01); *G10H 2220/106* (2013.01)

(58) Field of Classification Search
CPC ... G06V 40/28; G06F 3/04817; G10H 1/0008
(Continued)

(56) References Cited

U.S. PATENT DOCUMENTS

2008/0280680 A1   11/2008   Dutilly et al.
2014/0248956 A1    9/2014   Tarama
(Continued)

FOREIGN PATENT DOCUMENTS

CN    104598867 A    5/2015
CN    104754421 A    7/2015
(Continued)

OTHER PUBLICATIONS

European Patent Office, Office Action Issued in Application No. 21846566.4, Aug. 6, 2024, Netherlands, 56 pages.
(Continued)

*Primary Examiner* — William D Titcomb
(74) *Attorney, Agent, or Firm* — Alleman Hall & Tuttle LLP

(57) ABSTRACT

An interaction method and apparatus, a device and a readable medium. Among them, the method includes: playing first music; highlighting at least one action indicator icon among multiple action indicator icons displayed at predetermined positions on a user interface according to a target music beat in the first music; acquiring a limb action performed by a user; determining whether the limb action performed by the user matches an icon feature of the highlighted action indicator icon; and determining an interaction completion degree of the user according to a determined final matching result after the playing of the first music is finished. The method avoids the device complexity during interaction, and it is possible to improve the diversity and interestingness of interactive content, and improve the continuity and aesthetic of actions of a user.

18 Claims, 4 Drawing Sheets

(58) Field of Classification Search
USPC .......................................................... 382/103
See application file for complete search history.

(56) References Cited

U.S. PATENT DOCUMENTS

| | | | | |
|---|---|---|---|---|
| 2015/0331657 | A1* | 11/2015 | Bancroft | G06F 3/04842 |
| | | | | 715/727 |
| 2020/0371666 | A1* | 11/2020 | Ni | G06F 3/0488 |
| 2020/0409471 | A1* | 12/2020 | Tang | G06T 7/20 |

FOREIGN PATENT DOCUMENTS

| | | | |
|---|---|---|---|
| CN | 104598867 | B | 12/2017 |
| CN | 108536293 | A | 9/2018 |
| CN | 108815845 | A | 11/2018 |
| CN | 109799903 | A | 5/2019 |
| CN | 110544301 | A | 12/2019 |
| CN | 111857482 | A | 10/2020 |
| CN | 111857482 | B | 5/2022 |
| KR | 20180067964 | A | 6/2018 |
| WO | 2019184634 | A1 | 10/2019 |
| WO | 2022017181 | A1 | 1/2022 |

OTHER PUBLICATIONS

China National Intellectual Property Administration, Notification to Grant Patent Right Issued in Application No. 202010724931.1, Apr. 13, 2022, 4 pages.
China National Intellectual Property Administration, Office Action and Search Report Issued in Application No. 202010724931.1, Jun. 21, 2021, 20 pages.
China National Intellectual Property Administration, Office Action and Search Report Issued in Application No. 202010724931.1, Jan. 13, 2022, 22 pages.
ISA China Patent Office, International Search Report and Written Opinion Issued in Application No. PCT/CN2021/104899, Oct. 11, 2021, WIPO, 15 pages.
European Patent Office, Extended European Search Report Issued in Application No. 21846566.4, Nov. 10, 2023, Germany, 7 pages.

* cited by examiner

INTERACTION METHOD AND APPARATUS, DEVICE AND READABLE MEDIUM

CROSS-REFERENCE TO RELATED APPLICATIONS

The present application is a National Stage of International Application No. PCT/CN2021/104899, filed on Jul. 7, 2021, which claims priority to Chinese Patent Application No. 202010724931.1, filed on Jul. 24, 2020, both of the applications are hereby incorporated by reference in their entireties.

TECHNICAL FIELD

Embodiments of the present disclosure relates to the technical field of application development, in particular, to an interaction method and apparatus, a device and a readable medium.

BACKGROUND

With the rapid development of Internet technology, various applications are usually developed with a large number of entertainment games or props for users to increase user retention, so as to improve the service effect of the applications.

At present, among the existing entertainment games or props developed in the various applications, a new gesture icon will be randomly slid into an interface and an old gesture icon will be slid out with a music playing, and an interaction between a user and the application will be realized based on such setting. However, sliding of gesture icons in the current application is random, which has no connection with the music played. Therefore, an action of the user in an interaction process is also random, lacks the sense of rhythm and beauty, and the form of interaction content is relatively dull.

SUMMARY

In view of this, embodiments of the present disclosure provide an interaction method and apparatus, a device and a readable medium, which can realize the interaction between the user and the played music, and can also improve the diversity and interestingness of interactive content, and the continuity and aesthetic of actions of a user.

In a first aspect, an embodiment of the present disclosure provides an interaction method, including:
  playing first music;
  highlighting at least one action indicator icon among multiple action indicator icons displayed at predetermined positions on a user interface according to a target music beat in the first music;
  acquiring a limb action performed by a user;
  determining whether the limb action performed by the user matches an icon feature of the highlighted action indicator icon; and
  determining an interaction completion degree of the user according to a determined final matching result after the playing of the first music is finished.

In a second aspect, an embodiment of the present disclosure provides an interaction apparatus, including:
  a music playing module, configured to play first music;
  an icon highlighting module, configured to highlight at least one action indicator icon among multiple action indicator icons displayed at predetermined positions on a user interface according to a target music beat in the first music;
  a limb action acquiring module, configured to acquire the limb action performed by a user;
  a limb matching judging module, configured to determine whether the limb action performed by the user matches an icon feature of the highlighted action indicator icon; and
  an interacting module, configured to determine an interaction completion degree of the user according to a determined final matching result after the playing of the first music is finished.

In a third aspect, an embodiment of the present disclosure provides an electronic device, including:
  one or more processors;
  a memory for storing one or more programs;
  where the one or more processors is enabled to implement the interaction method described in any embodiment of the present disclosure when the one or more programs are executed by the one or more processors.

In a fourth aspect, an embodiment of the present disclosure provides a computer-readable storage medium having a computer program stored thereon, where when the computer program is executed by a processor, the interaction method described in any embodiment of the present disclosure is implemented.

In a fifth aspect, an embodiment of the present disclosure provides a computer program product, including a computer program, where the computer program is stored in a readable storage medium, and one or more processors of an electronic device may read the computer program from the readable storage medium, the computer program is executed by the one or more processors to enable the electronic device to execute the method described in any embodiment of the present disclosure.

In a sixth aspect, the present disclosure provides a computer program which is stored in a readable storage medium, and one or more processors of a device may read the computer program from the readable storage medium, the computer program is executed by the one or more processors to enable the electronic device to execute the method described in any embodiment of the present disclosure.

In an interaction method and an apparatus, a device and a readable medium provided by the embodiments of the present disclosure, at least one action indicator icon among multiple action indicator icons displayed at predetermined positions on a user interface is highlighted according to a target music beat in played music, so that the user may perform a corresponding limb action according to the highlighted action indicator icon, thus realizing an interaction between the user and the played music and the user interface. At the same time, whether the limb action performed by the user matches an icon feature of the highlighted action indicator icon is determined at each time of highlighting, and an interaction completion degree of the user is determined according to a determined final matching result after the playing of the music is finished. By adopting the technical solution, no additional auxiliary device is required when the user interacts with a terminal electronic device, to avoid the device complexity during interaction. At the same time, by displaying different action indicator icons at predetermined positions on the user interface and highlighting at least one action indicator icon according to the music beat, it is possible to improve the diversity and interestingness of interactive content, and improve the continuity and aesthetic of actions of a user.

BRIEF DESCRIPTION OF THE DRAWINGS

The above and other features, advantages and aspects of various embodiments of the present disclosure will more apparent when taken in conjunction with the accompanying figures and with reference to the following detailed description. Throughout the figures, the same or similar reference numbers refer to the same or similar elements. It should be understood that the figures are schematic, where originals and elements are not necessarily drawn to scale.

DESCRIPTION OF EMBODIMENTS

Figure 1:
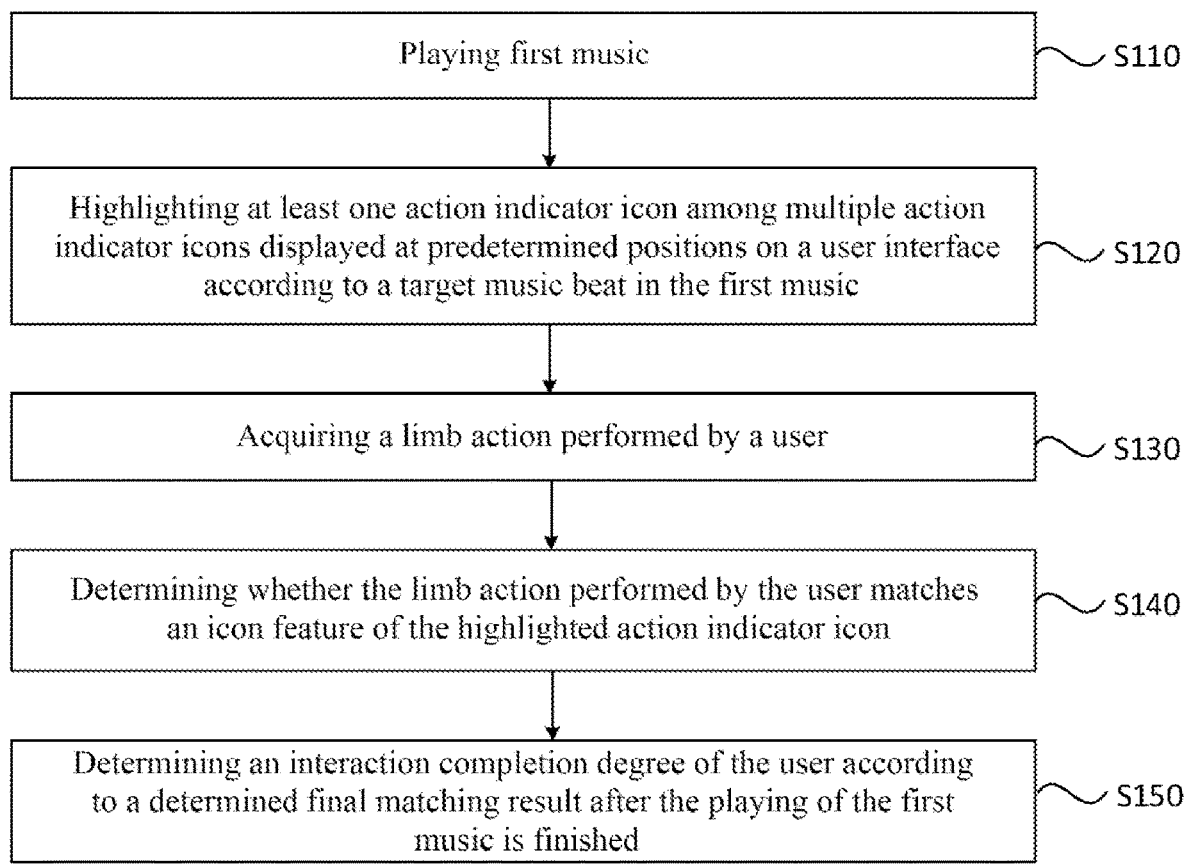
FIG. 1 depicts a flowchart of an interaction method provided by an embodiment of the present disclosure.

Embodiments of the present disclosure will be described in more detail below with reference to the accompanying drawings. Although certain embodiments of the present disclosure are shown in the drawings, it should be understood that the present disclosure may be implemented in various forms and should not be construed as being limited to the embodiments set forth herein. Instead, these embodiments are provided for a more thorough and complete understanding of the present disclosure. It should be understood that the drawings and embodiments of the present disclosure are only used for illustrative purposes, rather than limiting the protection scope of the present disclosure.

It should be understood that various steps described in a method embodiment of the present disclosure may be performed in different orders and/or in parallel. Furthermore, a method embodiment may include additional steps and/or execution of an illustrated step may be omitted in the method embodiment. The scope of the present disclosure is not limited in this aspect.

The term "comprising" and variations thereof herein are openness comprising, i.e., "comprising but not limited to". The term "based on" is "based at least in part on". The term "an embodiment" means "at least one embodiment"; the term "another embodiment" means "at least one additional embodiment"; the term "some embodiments" means "at least some embodiments". Relevant definitions of other terms will be given in the description below.

It should be noted that the concepts of "first" and "second" mentioned in the present disclosure are only used to distinguish different apparatus, modules, or units rather than limiting an order or an interdependence of the functions performed by these apparatus, modules or units.

It should be noted that the modifiers of "one" and "multiple" mentioned in the present disclosure are illustrative rather than restrictive, and the person skilled in the art should understand that unless otherwise clearly indicated in the context, they should be interpreted as "one or more".

Names of messages or information exchanged between multiple parties in the embodiments of the present disclosure are only for illustrative purposes rather than limiting the scope of these messages or information.

FIG. 1 depicts a flowchart of an interaction method provided by an embodiment of the present disclosure, an embodiment of the present disclosure can be applied to any kind of application programs. An interaction method provided by an embodiment of the present disclosure can be implemented by an interaction apparatus provided by an embodiment of the present disclosure, which may be implemented by software and/or hardware, and integrated in an electronic device for executing the method. The electronic device for executing the method in the present embodiment may include a mobile terminal, such as a smart phone, a palmtop computer, a tablet, a wearable device with a display screen, etc., and may also include a computer device, such as a desktop, a laptop, an all-in-one computer, etc.

Specifically, as shown in FIG. 1, an interaction method provided in an embodiment of the present disclosure may include the following steps:

S110, playing first music.

Specifically, the present disclosure may solve the problem that an interaction form of an existing application is relatively dull, and a user cannot interact with music and screen played, or an additional corresponding auxiliary device needs to be set up for interaction. By adopting the technical solution of the present disclosure, the user can interact with the music played and the user interface, and the user can also record a corresponding interactive video during the interaction, so as to improve an interactive experience of the user.

S120, highlighting at least one action indicator icon among multiple action indicator icons displayed at predetermined positions on a user interface according to a target music beat in the first music.

Since any kind of music is composed of a fixed combination of the downbeat(s) and the weak beat(s) together, and the music beats may have different playing pitch lengths, in order to realize the interaction between the user and the first music played, at least one action indicator icon among the multiple action indicator icons displayed at the predetermined positions on the user interface may be highlighted for the user respectively according to characteristics of the music beats, such as the downbeat(s), the weak beat(s) and playing pitch lengths, thus enabling the user to perform different limb actions under different music beats, thereby realizing the interaction between the user and the first music played and the user interface.

Specifically, the first music may include music to be played during a current interaction execution process selected by the user from a pre-configured fixed music collection or from a pre-connected music application. In an embodiment, before playing the first music, a beat detection process may be performed on the first music in advance to determine the target beats in the first music, so that there are accurately matched target music beats in the first music, in this way, the electronic device may determine all target music beats in the first music according to a pre-matching situation between the first music and the target music beat after the user selects the first music, so as to determine whether the target music beat is currently played in the subsequent playing process. In another embodiment, the electronic device may also detect a currently played beat of the first music in real time during the playing of the first music, and determine whether the currently played beat is the target music beat.

It should be noted that, since the music downbeat is more entertaining than the music weak beat from the perspective of the user, the target music beat may be set as the music downbeat in this embodiment. The at least one action indicator icon among the multiple action indicator icons displayed at the predetermined positions on the user interface is highlighted according to the music downbeat in the first music, thus enabling that the user may perform a corresponding limb action under the music downbeat, while not performing any limb action under the weak music beat, thereby increasing the continuity and aesthetic of actions of a user.

In an embodiment, in order to ensure an accurate interaction between the user and the first music, action indicator icons adapted to respective music beats, in this embodiment, may be highlighted at the predetermined positions on the user interface for the user respectively under different music beats according to a demand of the user for music interaction, and be displayed to the user, so as to instruct the user to perform limb actions in accordance with the corresponding action indicator icons under different music beats, thereby achieving interaction between the user and the first music played.

In this embodiment, after determining the respective target music beats (such as music downbeats) in the first music, the electronic device determines whether the target music beat is currently being played according to a playing progress of the first music. Each time it is detected that a target music beat of the first music is being displayed, the at least one action indicator icon among the multiple action indicator icons displayed at the predetermined positions on the user interface is selected according to a music attribute of the first music and a position correlation of the multiple action indicator icons displayed at the predetermined positions on the user interface, and the selected at least one action indicator icon is highlighted to indicate the limb action that the user needs to perform under the current target music beat, thus enabling the user to perform the corresponding limb action according to the limb action indicated by the highlighted action indicator icon, thereby realizing the interaction between the user and the music. In addition, the electronic device may also improve the diversity and interestingness of interactive content by highlighting the at least one action indicator icon displayed at a predetermined position in the user interface. In an embodiment, when the target music beat is a music downbeat, the electronic device does not highlight any action indicator icon when playing a music weak beat of the first music; and highlights the at least one action indicator icon when playing a music downbeat of the first music, thereby realizing an interactive operation between the user and the first music.

Figure 2:
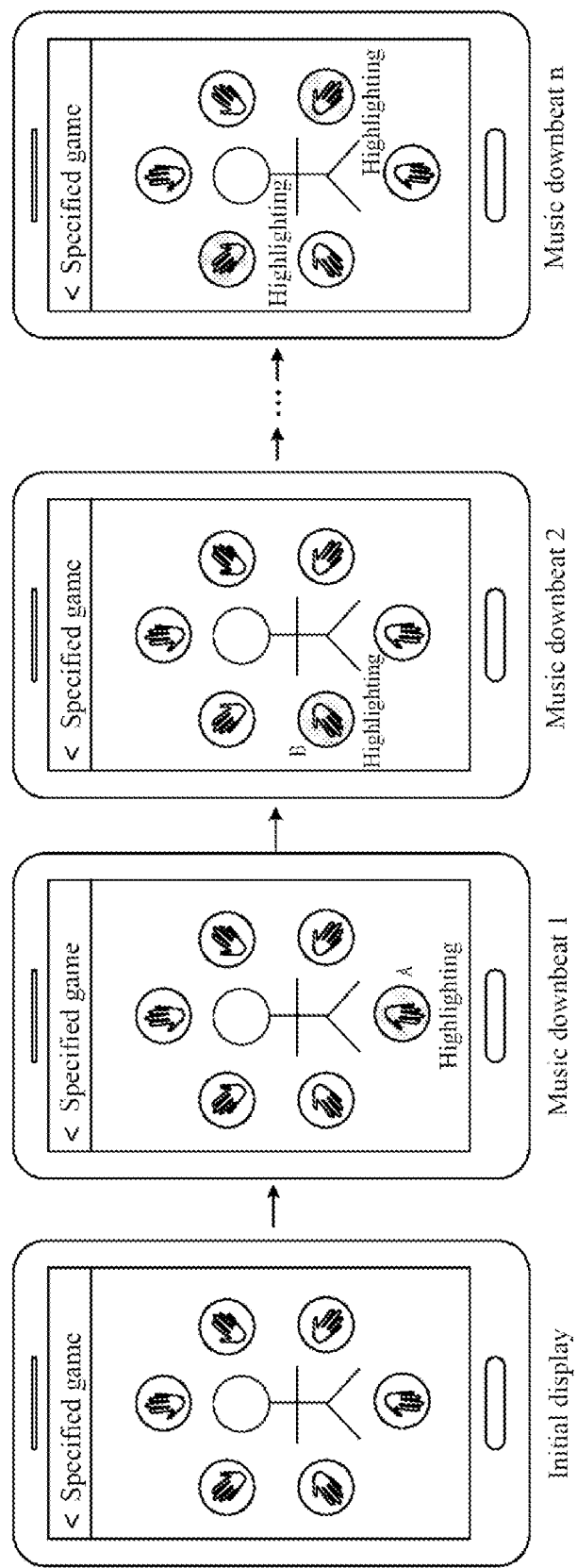
FIG. 2 depicts a schematic diagram of an interface displaying a plurality of action indicator icons at predetermined positions and their highlighting processes in a method provided by an embodiment of the present disclosure.

Exemplarily, in this embodiment, as shown in FIG. 2, action indicator icons representing different limb actions may be set at different predetermined positions on the user interface, where the action indicator icons may be gesture icons, and corresponding gestures icons may be set at multiple fixed position of the user interface, respectively. When it is detected that the currently played beat of the first music is a music downbeat, the electronic device may highlight at least one gesture icon from the respective gesture icons displayed at the predetermined positions on the user interface, thus enabling the user to move a corresponding palm and match his palm with the highlighted gesture icon, thereby realizing the interaction between the user and the music played.

At the same time, in order to ensure the aesthetics of the user when performing the corresponding limb action according to the highlighted action indicator icon, in this embodiment, the highlighting the at least one action indicator icon among the multiple action indicator icons displayed at the predetermined positions on the user interface according to the target music beat in the first music may include: highlighting the at least one action indicator icon according to a music attribute of the first music and a position correlation of the multiple action indicator icons displayed at the predetermined positions on the user interface.

Specifically, the music attribute in the present disclosure may include a music type, a music rhythm, a music volume and other music characteristics of the first music. Based on the detection of the music attribute of the first music and further according to the position correlation between the respective action indicator icons displayed at the predetermined positions on the user interface, it is possible to select and highlight at least one action indicator icon from the multiple action indicator icons at the predetermined positions on the user interface. The user performs the corresponding action according to the highlighted action indicator icon, which can not only conform to the music attribute of the first music, but also ensure the aesthetic of the action. For example, when a rhythm of the first music is slow, an amplitude of an action change of the user may be very small each time, at this time, a position change between action indicator icons highlighted by the electronic device each time is correspondingly small. For example, action indicator icons which are adjacent in position are highlighted in turn. For example, in FIG. 2, under music downbeat 1, the electronic device highlights icon A at the bottom-middle position, and under music downbeat 2, the electronic device highlights icon B at the bottom-left adjacent to icon A. In addition, in an embodiment, in order to ensure that the user successfully performs corresponding limb actions, if each action indicator icon among the multiple action indicator icons displayed at the predetermined positions on the user interface requires interaction through a user gesture, that is, the multiple action indicator icons displayed at the predetermined positions on the user interface are all gesture icons, then at most two action indicator icons may be selected for highlighting, in other words, one or two action indicator icons are selected and highlighted, so that the user may successfully perform the corresponding limb action(s). The above description is only an example. There is no limit to the number of highlighted action indicator icons in the present disclosure, and corresponding highlighted action indicator icons may be set according to different music and actions.

S130, acquiring a limb action performed by a user.

Specifically, after each time of highlighting of the at least one action indicator icon among the multiple action indicator icons displayed at the predetermined positions on the user interface, the user will perform a corresponding limb action according to the highlighted action indicator icon to interact with the first music played. At this time, after each time the at least one action indicator icon is highlighted, the limb action performed by the user may be obtained to determine whether the limb action performed by the user matches an icon feature of the highlighted action indicator icon.

S140, determining whether the limb action performed by the user matches an icon feature of the highlighted action indicator icon.

Specifically, during the playing of the first music, at least one action indicator icon among the multiple action indicator icons displayed at predetermined positions on the user interface will be highlighted at different playing moments according to the determined target music beat. The user may perform the corresponding limb action according to the highlighted action indicator icon. In order to determine an interaction completion degree between the user and the first music, the electronic device needs to determine a matching degree between the limb action performed by the user and the icon feature of the action indicator icon highlighted at this time after each time the at least one action indicator icon is highlighted.

The icon feature may include at least one of a predefined recognition range of the highlighted action indicator icon and a specific action indicated by the highlighted action indicator icon. Therefore, after each time of highlighting of the at least one action indicator icon among the multiple action indicator icons displayed at predetermined positions on the user interface, the electronic device needs to determine whether the limb action performed by the user at this time of highlighting of the action indicator icon matches the icon feature of the highlighted action indicator icon, and determine a final matching result at the end of music playing based on matching results at each time of highlighting. When the icon feature includes the predefined recognition range of the highlighted action indicator icon, the electronic device determines whether the limb action performed by the user matches the icon feature of the highlighted action indicator icon by determining whether the limb action performed by the user is located in the pre-display area of the highlighted action indicator icon. When the icon special effect includes the specific action indicated by the highlighted action indicator icon, whether the limb action performed by the user matches the icon feature of the highlighted action indicator icon is determined by matching the limb action performed by the user with the action indicated by the highlighted action indicator icon.

Exemplarily, in this embodiment, when at least one action indicator icon is highlighted each time, a success rate of the limb action performed by the user according to the highlighted action indicator icon, i.e., the interaction completion degree of the user, may be analyzed by judging whether the limb action performed by the user is successfully matched with the highlighted action indicator icon this time.

S150, determining an interaction completion degree of the user according to a determined final matching result after the playing of the first music is finished.

In an implementation where the playing of the first music is finished in this embodiment may include the following two situations: 1) the playing of the first music is ended up automatically after the playing of the first music is completed; 2) the playing for the first music is passively ended up according to an exit operation sent by the user during its playing. After the playing of the first music is finished, the electronic device may determine the interaction completion degree of user interaction. The electronic may determine the final matching result of the user in this interaction process according to matching results between the limb actions performed by the user and the icon features of the highlighted action indicator icons when the at least one action indicator icon is highlighted each time under the target music beats at different playing moments. The electronic device may determine the final matching result (for example, P/N) between the limb actions performed by the user and the icon features of the highlighted action indicator icons in this interaction process through the number of occurrences N of the highlighted action indicator icons during the playing of the first music and the number of successful matches P between the limb actions performed by the user and the icon features of the highlighted action indicator icons. The final matching result may accurately represent the success rate of the completion of the user in this interaction, and then the interaction completion degree of the user of this interaction may be determined according to the determined final matching result.

It should be noted that in the present disclosure, the interaction completion degree of the user may be displayed in different forms, such as, an interaction score, or an interaction proportion, which is not limited in the present disclosure.

Exemplarily, when determining the interaction completion degree of the user in this embodiment, respective matching results of each time of highlighting of the action indicator icon may be summed and averaged, and the averaged matching result is taken as the interaction completion degree of the user.

In the technical solution provided by the embodiments of the present disclosure, at least one action indicator icon among multiple action indicator icons displayed at predetermined positions on a user interface is highlighted according to a target music beat in played music, so that the user may perform a corresponding limb action according to the highlighted action indicator icon, thus realizing an interaction between the user and the played music and the user interface. At the same time, whether the limb action performed by the user matches an icon feature of the highlighted action indicator icon is determined at each time of highlighting, and an interaction completion degree of the user is determined according to a determined final matching result after the playing of the music is finished. By adopting the technical solution, no additional auxiliary device is required when the user interacts with a terminal electronic device, to avoid the device complexity during interaction. At the same time, by displaying different action indicator icons at predetermined positions on the user interface and highlighting at least one action indicator icon according to the music beat, it is possible to improve the diversity and interestingness of interactive content, and improve the continuity and aesthetic of actions of a user.

On the basis of the technical solution provided by the above embodiments, the judgment process of determining whether the limb action performed by the user matches the icon feature of the highlighted action indicator icon in the interaction method provided by the embodiments of the present disclosure will be further described. When the icon feature includes the predefined recognition range of the highlighted action indicator icon, after highlighting the at least one action indicator icon among the multiple action indicator icons displayed at predetermined positions on the user interface in the above interaction method, the determining whether the limb action performed by the user matches the icon feature of the highlighted action indicator icon may include: detecting, within a preset highlight period, whether a specific limb of the user is located in a pre-display area of the highlighted action indicator icon; and determining whether the limb action performed by the user matches the icon feature indicated by the highlighted action indicator icon according to the detection result.

After it is detected that the target music beat of the first music is currently playing, and the electronic device highlights at least one action indicator icon among the multiple action indicator icons displayed at predetermined positions on the user interface, the user will perform the corresponding limb action according to the highlighted action indicator icon. Since each action indicator icon will be provided with a corresponding pre-display area on the user interface, when the user performs the corresponding limb action according to the highlighted action indicator icon, the electronic device may prompt the user to move the limb corresponding to the action indicator icon to the pre-display area where the highlighted action indicator icon is located through prompt information on the user interface. At the same time, in order to ensure the timeliness of performing the corresponding limb action by the user according to the highlighted action indicator icon, the corresponding preset highlighting period is also set in advance in this embodiment, for prompting the user to complete performing the limb action corresponding to the highlighted action indicator icon within the preset highlight period. If the electronic device fails to detect that the specific limb of the user is in the pre-display area of the highlighted action indicator icon within the preset highlight period, it means that the limb action performed by the user does not match the icon feature indicated by the highlighted action indicator icon successfully. Therefore, in this embodiment, whether the limb action performed by the user matches the icon feature indicated by the highlighted action indicator icon may be analyzed by detecting, within the preset highlight period, whether the specific limb of the user is located in the pre-display area of the highlighted action indicator icon. If it can be detected within the preset highlight period that the specific limb of the user is in the pre-display area of the highlighted action indicator icon, it means that the user has moved the specific limb to the pre-display area of the highlighted action indicator icon within the preset highlight period, and then it is determined that the limb action performed by the user is successfully matched with the highlighted action indicator icon; while if it is not detected within the preset highlight period that the specific limb of the user is in the pre-display area of the highlighted action indicator icon, it means that the user fails to move the specific limb to the pre-display area of the highlighted action indicator icon within the preset highlight period, it is thus determined that the limb action performed by the user is not successfully matched with the highlighted action indicator icon.

Exemplarily, in this embodiment, the detecting, within the preset highlight period, whether the specific limb of the user is located in the pre-display area of the highlighted action indicator icon may include: collecting a limb action image of the user in real time within the preset highlight period; and judging whether the specific limb of the user is located in the pre-display area of the highlighted action indicator icon according to the limb action image.

Specifically, within the preset highlight period after each time the at least one action indicator icon among the multiple action indicator icons displayed at the predetermined positions on the user interface is highlighted, the electronic device collects the limb action image of the user in real time, and at the same time, respective limb action images record different moving positions of the user when moving the specific limb. By recognizing feature points representing the specific limb in each limb action image collected within the preset highlighting period, and the area boundary feature point(s) representing the pre-display area of the highlighted action indicator icon, further by analyzing a position relationship between the feature point(s) of the specific limb and the area boundary feature point(s), it may be determined whether the specific limb of the user moves to the pre-display area of the highlighted action indicator icon.

When the icon feature includes a specific action predefined by the highlighted action indicator icon, after it is detected that the target music beat of the first music is currently playing, and the electronic device highlights at least one action indicator icon among the multiple action indicator icons displayed at predetermined positions on the user interface, the user will perform the corresponding limb action according to the specific action indicated by the highlighted action indicator icon, where the specific action may be, for example, a gesture action such as "ok" or "a scissor hand" made by a left or a right hand. The user performs the corresponding specific action according to the at least one highlighted action indicator icon. Thus after each time of highlighting of the at least one action indicator icon and acquiring of the limb action performed by the user, whether the specific action performed by the user is consistent with the specific action indicated by the highlighted action indicator icon is determined within the preset highlight period to judge the matching degree between the specific action performed by the user and the highlighted action indicator icon.

Exemplarily, within the preset highlight period after each time the at least one action indicator icon among the multiple action indicator icons displayed at the predetermined positions on the user interface is highlighted, the electronic device collects the limb action image of the user in real time, where the limb action image records the specific action indicated by the highlighted action indicator icon and the limb action performed by the user. Through key feature points representing the specific action indicated by the highlighted action indicator icon in each limb action image collected within the preset highlight period, and key feature points of the limb action performed by the user, and through analysis of a matching relationship between the key feature points, an action posture of the highlighted action indicator icon and an action posture of the limb action performed by the user are determined, so as to judge whether the two action postures are consistent, thereby determining the matching degree of the limb action performed by the user and the specific action indicated by the highlighted action indicator icon.

Figure 3:
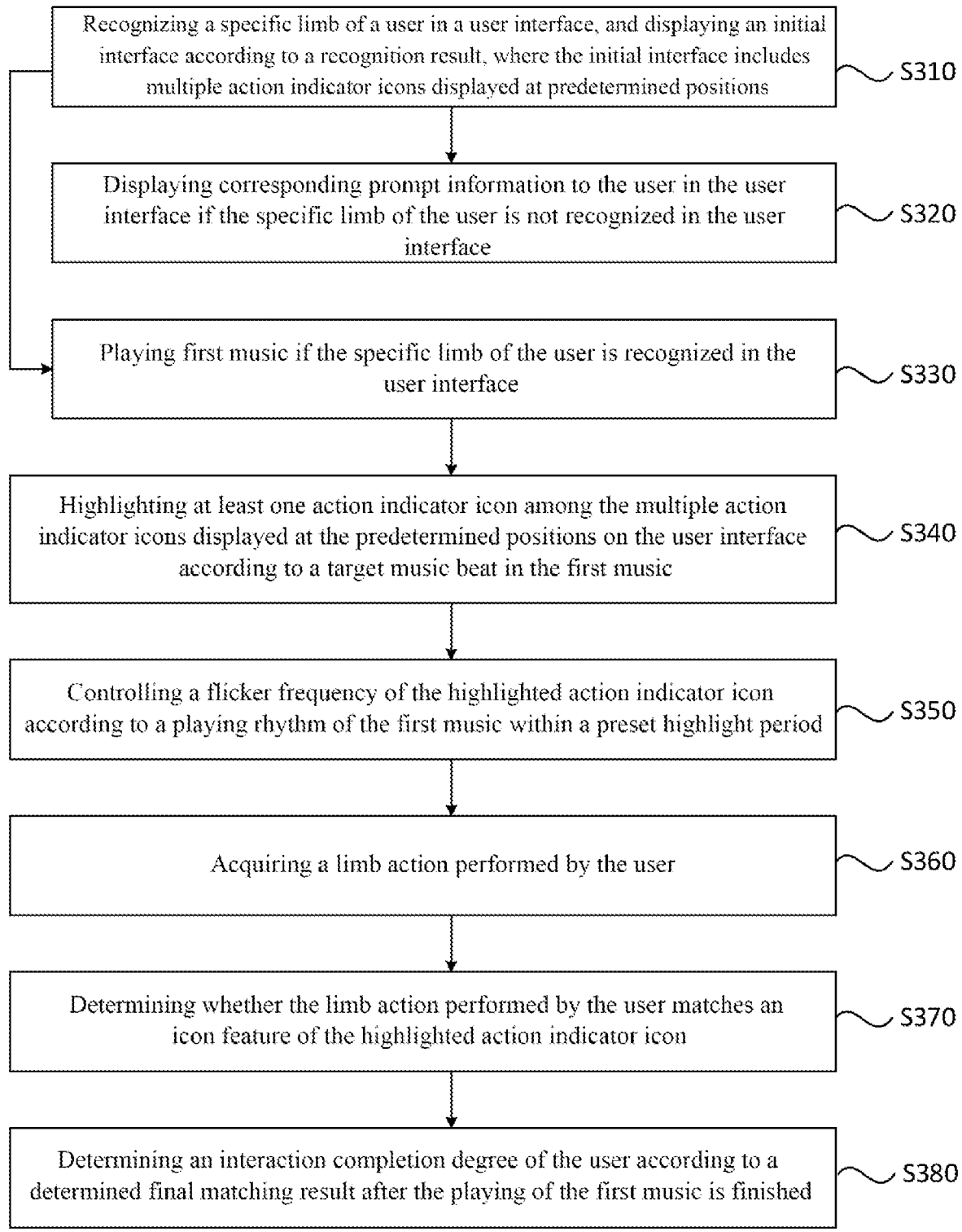
FIG. 3 depicts a flowchart of another interaction method provided by an embodiment of the present disclosure.

FIG. 3 depicts a flowchart of another interaction method provided by an embodiment of the present disclosure. This embodiment is optimized on the basis of the various alternatives provided by the above embodiments. Specifically, this embodiment mainly introduces other existent interaction processes in detail.

In an implementation as shown in FIG. 3, the method in this embodiment may include the following steps:

S310, recognizing a specific limb of a user in a user interface, and displaying an initial interface according to a recognition result, where the initial interface includes multiple action indicator icons displayed at predetermined positions.

In order to ensure an effective execution of the interaction, after detecting that the user has started an application program for executing this interaction, the electronic device may detect whether the specific limb specified by the multiple action indicator icons displayed at predetermined positions on the user interface has been placed in the user interface. When determining that the specific limb of the user is recognized in the user interface, the electronic device displays a preset initial interface to the user, where the initial interface may include the multiple action indicator icons displayed at the predetermined positions, and the electronic device starts playing first music to enable the user to participate in the music interaction.

S320, displaying corresponding prompt information to the user in the user interface if the specific limb of the user is not recognized in the user interface.

In an implementation, if the specific limb of the user is not recognized in the user interface, it means that the user is not ready to play the game, the electronic device may display the corresponding prompt information to the user in the user interface to prompt the user to place the specific limb in the user interface for facilitating the interaction.

S330, playing the first music if the specific limb of the user is recognized in the user interface.

S340, highlighting at least one action indicator icon among the multiple action indicator icons displayed at the predetermined positions on the user interface according to a target music beat in the first music.

S350, controlling a flicker frequency of the highlighted action indicator icon according to a playing rhythm of the first music within a preset highlight period.

In an implementation, after each time a certain target beat of the first music is played and at least one action indicator icon among the multiple action indicator icons displayed at the predetermined positions is highlighted, in order to improve the highlight diversity of the multiple action indicator icons displayed at the predetermined positions on the user interface, in the present disclosure, the playing rhythm of the first music may be detected in real time, and the corresponding flicker frequency may be set for the highlighted action indicator icon according to the playing rhythm within the preset highlight period of the highlighted action indicator icon, thereby controlling the highlighted action indicator icon to flicker according to the corresponding flicker frequency. The controlling of the flicker frequency of the highlighted action indicator icon according to the music rhythm can improve the interactive interestingness between the user and the first music.

S360, acquiring a limb action performed by the user.

S370, determining whether the limb action performed by the user matches an icon feature of the highlighted action indicator icon.

S380: determining an interaction completion degree of the user according to a determined final matching result after the playing of the first music is finished.

The execution process of S330-S340 and S360-S380 is consistent with that of S110-S150 in the present disclosure. The specific execution scheme has been described in S110-S150, which will not be described here.

In the technical solution provided by the embodiments of the present disclosure, at least one action indicator icon among multiple action indicator icons displayed at predetermined positions on a user interface is highlighted according to a target music beat in played music, so that the user may perform a corresponding limb action according to the highlighted action indicator icon, thus realizing an interaction between the user and the played music and the user interface. At the same time, whether the limb action performed by the user matches an icon feature of the highlighted action indicator icon is determined at each time of highlighting, and an interaction completion degree of the user is determined according to a determined final matching result after the playing of the music is finished. By adopting the technical solution, no additional auxiliary device is required when the user interacts with a terminal electronic device, to avoid the device complexity during interaction. At the same time, by displaying different action indicator icons at predetermined positions on the user interface and highlighting at least one action indicator icon according to the music beat, it is possible to improve the diversity and interestingness of interactive content, and improve the continuity and aesthetic of actions of a user.

Figure 4:
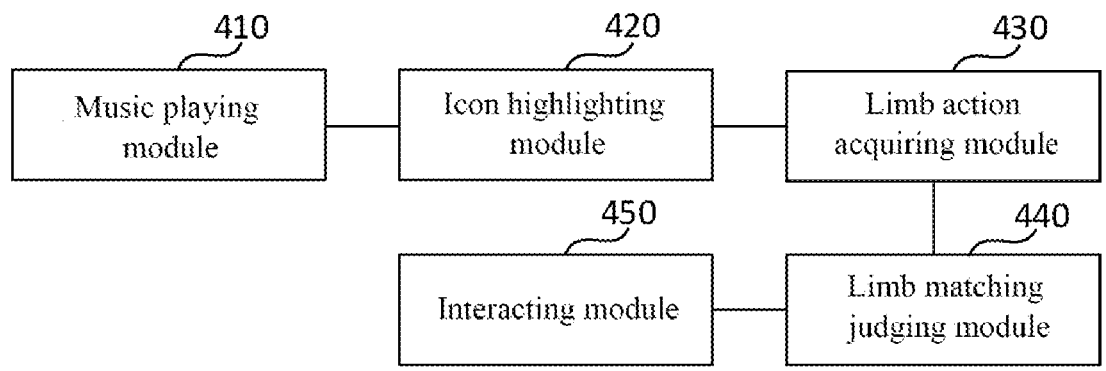
FIG. 4 depicts a structural diagram of an interaction apparatus provided by an embodiment of the present disclosure.

FIG. 4 depicts a structural diagram of an interaction apparatus provided by an embodiment of the present disclosure. The embodiments of the present disclosure may be applied to any application program, and the apparatus may be implemented by a software and/or a hardware, and integrated in an electronic device for executing the method.

As shown in FIG. 4, the interaction apparatus in an embodiment of the present disclosure may specifically include:

a music playing module 410, configured to play first music;

an icon highlighting module 420, configured to highlight at least one action indicator icon among multiple action indicator icons displayed at predetermined positions on a user interface according to a target music beat in the first music;

a limb action acquiring module 430, configured to acquire the limb action performed by a user;

a limb matching judging module 440, configured to determine whether the limb action performed by the user matches an icon feature of the highlighted action indicator icon; and an interacting module 450, configured to determine an interaction completion degree of the user according to a determined final matching result after the playing of the first music is finished.

In the technical solution provided by the embodiments of the present disclosure, at least one action indicator icon among multiple action indicator icons displayed at predetermined positions on a user interface is highlighted according to a target music beat in played music, so that the user may perform a corresponding limb action according to the highlighted action indicator icon, thus realizing an interaction between the user and the played music and the user interface. At the same time, whether the limb action performed by the user matches an icon feature of the highlighted action indicator icon is determined at each time of highlighting, and an interaction completion degree of the user is determined according to a determined final matching result after the playing of the music is finished. By adopting the technical solution, no additional auxiliary device is required when the user interacts with a terminal electronic device, to avoid the device complexity during interaction. At the same time, by displaying different action indicator icons at predetermined positions on the user interface and highlighting at least one action indicator icon according to the music beat, it is possible to improve the diversity and interestingness of interactive content, and improve the continuity and aesthetic of actions of a user.

Furthermore, the above icon highlighting module 420 may be specifically configured to:

highlight the at least one action indicator icon according to a music attribute of the first music and a position correlation of the multiple action indicator icons displayed at the predetermined positions on the user interface.

Furthermore, the above limb matching judging module 440 may be specifically configured to:

detect, within a preset highlight period, whether a specific limb of the user is located in a pre-display area of the highlighted action indicator icon; and determine whether the limb action performed by the user matches the icon feature indicated by the highlighted action indicator icon according to a detection result.

Furthermore, the above limb matching judging module 440 may further be specifically configured to:

collect a limb action image of the user in real time within the preset highlight period; and judge whether the specific limb of the user is located in the pre-display area of the highlighted action indicator icon according to the limb action image.

Furthermore, the above limb matching judging module 440 may further be specifically configured to:

match the limb action performed by the user with an action identified from the highlighted action indicator icon to determine whether the limb action performed by the user matches the icon feature of the highlighted action indicator icon.

Furthermore, the above interaction apparatus may further include:

an icon flickering module, configured to control a flicker frequency of the highlighted action indicator icon according to a playing rhythm of the first music within a preset highlight period.

Furthermore, the above interaction apparatus may further include:

a limb recognizing module, configured to recognize a specific limb of the user in the user interface, and displaying an initial interface according to a recognition result, where the initial interface includes the multiple action indicator icons displayed at the predetermined positions.

Furthermore, the above interaction apparatus may further include:

a limb recognition prompting module, configured to display corresponding prompt information to the user in the user interface if the specific limb of the user is not recognized in the user interface.

Furthermore, the above interacting module 450 may be specifically configured to:

average all matching results after each time of highlighting of the at least one action indicator icon to obtain the interaction completion degree of the user.

The interaction apparatus provided by the embodiment of the present disclosure and the interaction method provided by the above embodiments belongs to the same inventive concept. For technical details not described in detail in the embodiment of the present disclosure, refer to the above embodiments, and the embodiment of the present disclosure has the same beneficial effects as the above embodiments.

In the following, reference is made to FIG. 5, which shows a schematic structural diagram of an electronic device 500 suitable for implementing an embodiment of the present disclosure. The electronic device in an embodiment of the present disclosure may include, but is not limited to, mobile terminals such as a mobile phone, a notebook computer, a digital broadcast receiver, a PDA (personal digital assistants), a PAD (portable android device), a PMP (portable multimedia player), a vehicle-mounted terminal (such as a vehicle navigation terminal), a wearable electronic device, etc., and stationary terminals such as a digital TV, a desktop computer, etc. The electronic device shown in FIG. 5 is only an example, which should not impose any limitation on the function and applying scope of the embodiments of the present disclosure.

Figure 5:
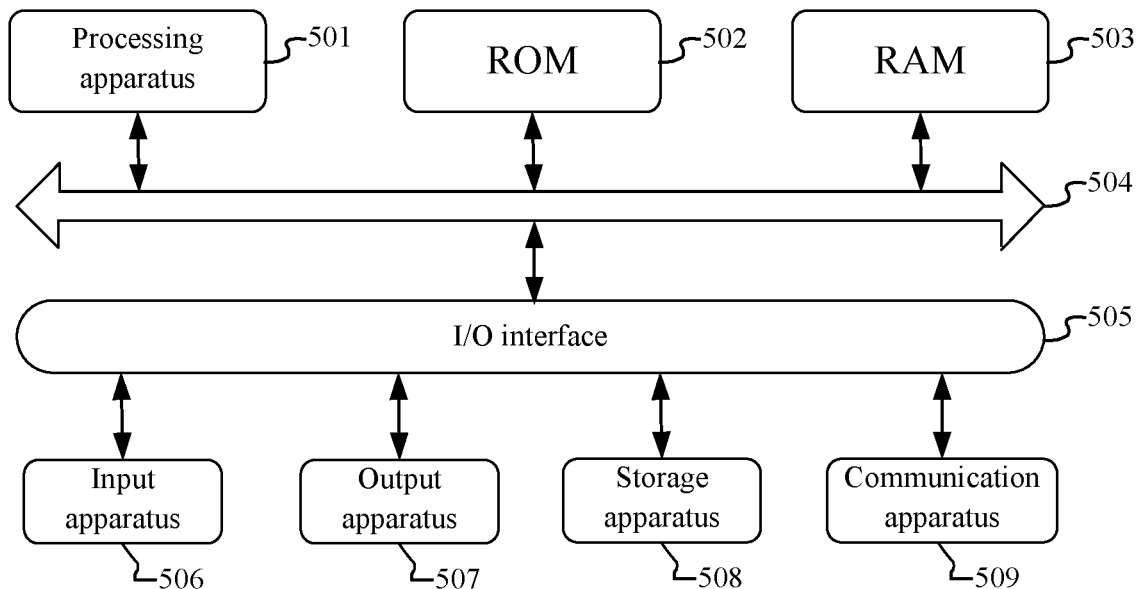
FIG. 5 depicts a structural diagram of an electronic device provided by an embodiment of the present disclosure.

As shown in FIG. 5, the electronic device 500 may include a processing apparatus (e.g., a central processing unit, a graphics processor, etc.) 501 that that may perform various appropriate actions and processes according to a program stored in a read only memory (Read only memory, ROM) 502 or a program loaded from a storage apparatus 508 into a random access memory (Random access memory, RAM) 503. Various programs and data necessary for the operation of the electronic device 500 are further stored in the RAM 503. The processing apparatus 501, ROM 502, and RAM 503 are connected to each other through a bus 504. And an input/output (Input/output, I/O) interface 505 is also connected to the bus 504.

Generally, the following apparatuses may be connected to the I/O interface 505: an input apparatus 506 including, for example, a touch screen, a touchpad, a keyboard, a mouse, a camera, a microphone, an accelerometer, a gyroscope, etc.; an output apparatus 507 including, for example, a liquid crystal display (Liquid crystal display, LCD), a speaker, a vibration, etc.; a storage apparatus 508 including, for example, a magnetic tape, a hard disk, etc.; and a communication apparatus 509. The communication apparatus 509 may allow the electronic device 500 to communicate wirelessly or by wire with other devices to exchange data. Although FIG. 5 shows the electronic device 500 having various apparatus, it should be understood that not all of the illustrated apparatuses are required to be implemented or provided. More or fewer apparatuses may alternatively be implemented or provided Specially, according to an embodiment of the present disclosure, the processes described above with reference to the flowcharts may be implemented as a computer software program. For example, an embodiment of the present disclosure includes a computer program product including a non-transitory computer program carried on a computer-readable medium, where the computer program includes a program code for performing the method illustrated in the flowchart. In such embodiment, the computer program may be downloaded and installed from a network via the communication apparatus 509, or installed from the storage apparatus 508, or installed from the ROM 502. When the computer program is executed by the processing apparatus 501, the steps in the methods of the embodiment of the present disclosure are executed to realize the above defined function.

It should be noted that the computer-readable medium described in the present disclosure may be a computer-readable signal medium or a computer-readable storage medium or any combination thereof. The computer-readable storage medium may be, for example, but not limited to, an electrical, a magnetic, an optical, an electromagnetic, an infrared, or a semiconductor system, apparatus or device, or a combination thereof. More specific examples of the computer readable storage media may include, but are not limited to, an electrical connection with one or more wires, a portable computer disk, a hard disk, a random-access memory (RAM), a read only memory (ROM), an erasable programmable read only memory (Electrical programmable read only memory, EPROM or flash memory), an optical fiber, a portable compact disk read only memory (Compact disc read only memory, CD-ROM), an optical storage device, a magnetic storage device, or any suitable combination thereof. In the present disclosure, the computer-readable storage medium may be any tangible medium that includes or stores a program that may be used by or used in combination with an instruction execution system, apparatus, or device. And in the present disclosure, the computer-readable signal medium may include a data signal propagated in baseband or as part of a carrier wave, carrying computer-readable program code therein. Such propagated data signal may take a variety of forms, including but not limited to an electromagnetic signal, an optical signal, or any suitable combination thereof. The computer-readable signal medium may also be any computer-readable medium other than the computer-readable storage medium, and the computer-readable signal medium can transmit, propagate, or transport the program used by or used in combination with the instruction execution system, apparatus or device. The program code included on the computer readable medium may be transmitted through any suitable medium including, but not limited to, an electrical wire, an optical fiber cable, a radio frequency (Radio Frequency, RF), etc., or any suitable combination thereof.

In some embodiments, the electronic device may use any currently known or future developed network protocol such as HTTP (HyperText Transfer Protocol) for communication, and may be interconnected with any form or medium of digital data communication (e.g., a communication network). Examples of the communication network include a local area network (Local area network, "LAN"), a wide area network (Wide area network, "WAN"), an internet (e.g., the Internet), and a peer-to-peer network (e.g., an ad hoc peer-to-peer network), as well as any currently known or future developed network.

The above-mentioned computer-readable medium may be included in the above-mentioned electronic device; or may exist alone without being assembled into the electronic device.

The above-mentioned computer-readable medium carries one or more programs, and when the above-mentioned one or more programs are executed by the electronic device, the electronic device is caused to: play first music; highlight at least one action indicator icon among multiple action indicator icons displayed at predetermined positions on a user interface according to a target music beat in the first music; acquire a limb action performed by a user; determine whether the limb action performed by the user matches an icon feature of the highlighted action indicator icon; and determine an interaction completion degree of the user according to a determined final matching result after the playing of the first music is finished.

The computer program code for performing an operation of the present disclosure may be written in one or more programming languages or a combination thereof, where the above programming languages include but are not limited to an object-oriented programming language, such as Java, Smalltalk, and C++, as well as a conventional procedural programming language, such as "C" or similar programming languages. The program code may be executed entirely on a user computer, executed partly on a user computer, executed as a stand-alone software package, executed partly on a user computer and partly on a remote computer, or executed entirely on a remote computer or a server. In a case involving the remote computer, the remote computer may be connected to the user computer through any kind of network, including a local area network (LAN) or a wide area network (WAN), or may be connected to an external computer (e.g., connected via the Internet using an Internet service provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, a program segment, or a portion of code that includes one or more executable instructions for implementing a specified logical function. Furthermore, it should be noted that, in some alternative implementations, functions indicated in the blocks may occur in an order different from that indicated in the figures. For example, two blocks shown in succession may, in fact, be executed substantially concurrently, or the blocks may sometimes be executed in a reverse order, depending on the functionality involved. It should also be noted that each block of the block diagrams and/or flowcharts, or a combination of blocks in the block diagrams and/or flowcharts may be implemented in a special purpose hardware-based system that performs a specified function or operation, or may be implemented in a combination of special purpose hardware and a computer instruction.

The involved modules described in embodiments of the present disclosure may be implemented by means of software, and may also be implemented by means of hardware. Among them, names of these modules do not constitute a limitation on the modules per se under certain circumstances.

The foregoing functions described herein may be performed, at least in part, by one or more hardware logic components. For example, without limitation, exemplary types of hardware logic components that may be used include: a field programmable gate array (Field programmable gate array, FPGA), an application specific integrated circuit (Application specific integrated circuit, ASIC), an application specific standard product (Application specific standard parts, ASSP), a system on chip (System on chip, SOC), a complex programmable logical device (Complex programmable logic device, CPLD) and more.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, a magnetic, an optical, an electromagnetic, an infrared, or a semiconductor system, apparatus, or device, or any suitable combination of the foregoing. More specific examples of machine-readable storage medium would include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination of the foregoing.

According to one or more embodiments of the present disclosure, an interaction method is provided, which includes:
  playing first music;
  highlighting at least one action indicator icon among multiple action indicator icons displayed at predetermined positions on a user interface according to a target music beat in the first music;
  acquiring a limb action performed by a user;
  determining whether the limb action performed by the user matches an icon feature of the highlighted action indicator icon; and
  determining an interaction completion degree of the user according to a determined final matching result after the playing of the first music is finished.

According to one or more embodiments of the present disclosure, in the above method, the highlighting the at least one action indicator icon among the multiple action indicator icons displayed at the predetermined positions on the user interface according to the target music beat in the first music includes:
  highlighting the at least one action indicator icon according to a music attribute of the first music and a position correlation of the multiple action indicator icons displayed at the predetermined positions on the user interface.

According to one or more embodiments of the present disclosure, in the above method, the determining whether the limb action performed by the user matches the icon feature of the highlighted action indicator icon includes:
  detecting, within a preset highlight period, whether a specific limb of the user is located in a pre-display area of the highlighted action indicator icon; and
  determining whether the limb action performed by the user matches the icon feature indicated by the highlighted action indicator icon according to the detection result.

According to one or more embodiments of the present disclosure, in the above method,
  the detecting, within the preset highlight period, whether the specific limb of the user is located in the pre-display area of the highlighted action indicator icon includes:
  collecting a limb action image of the user in real time within the preset highlight period; and
  judging whether the specific limb of the user is located in the pre-display area of the highlighted action indicator icon according to the limb action image.

According to one or more embodiments of the present disclosure, in the above method, the determining whether the limb action performed by the user matches the icon feature of the highlighted action indicator icon includes:
  matching the limb action performed by the user with an action identified from the highlighted action indicator icon to determine whether the limb action performed by the user matches the icon feature of the highlighted action indicator icon.

According to one or more embodiments of the present disclosure, the above method further includes:
  controlling a flicker frequency of the highlighted action indicator icon according to a playing rhythm of the first music within a preset highlight period.

According to one or more embodiments of the present disclosure, the above method further includes:
  recognizing a specific limb of the user in the user interface, and displaying an initial interface according to a recognition result, where the initial interface includes the multiple action indicator icons displayed at the predetermined positions.

According to one or more embodiments of the present disclosure, the above method further includes:
  displaying corresponding prompt information to the user in the user interface if the specific limb of the user is not recognized in the user interface.

According to one or more embodiments of the present disclosure, in the above method, the determining the interaction completion degree of the user according to the determined final matching result after the playing of the first music is finished includes:
  averaging all matching results after each time of highlighting of the at least one action indicator icon to obtain the interaction completion degree of the user.

According to one or more embodiments of the present disclosure, an interaction apparatus is provided, which includes:
  a music playing module, configured to play first music;
  an icon highlighting module, configured to highlight at least one action indicator icon among multiple action indicator icons displayed at predetermined positions on a user interface according to a target music beat in the first music;
  a limb action acquiring module, configured to acquire the limb action performed by a user;
  a limb matching judging module, configured to determine whether the limb action performed by the user matches an icon feature of the highlighted action indicator icon; and
  an interacting module, configured to determine an interaction completion degree of the user according to a determined final matching result after the playing of the first music is finished.

According to one or more embodiments of the present disclosure, in the interaction apparatus, the icon highlighting module is specifically configured to:
  highlight the at least one action indicator icon according to a music attribute of the first music and a position correlation of the multiple action indicator icons displayed at the predetermined positions on the user interface.

According to one or more embodiments of the present disclosure, the limb matching judging module is specifically configured to:
  detect, within a preset highlight period, whether a specific limb of the user is located in a pre-display area of the highlighted action indicator icon; and
  determine whether the limb action performed by the user matches the icon feature indicated by the highlighted action indicator icon according to a detection result.

According to one or more embodiments of the present disclosure, the limb matching judging module is specifically configured to:
  collect a limb action image of the user in real time within the preset highlight period; and
  judge whether the specific limb of the user is located in the pre-display area of the highlighted action indicator icon according to the limb action image.

According to one or more embodiments of the present disclosure, the limb matching judging module is specifically configured to:
  match the limb action performed by the user with an action identified from the highlighted action indicator icon to determine whether the limb action performed by the user matches the icon feature of the highlighted action indicator icon.

According to one or more embodiments of the present disclosure, the interaction apparatus further includes:
  an icon flickering module, configured to control a flicker frequency of the highlighted action indicator icon according to a playing rhythm of the first music within a preset highlight period.

According to one or more embodiments of the present disclosure, the interaction apparatus further includes:
  a limb recognizing module, configured to recognize a specific limb of the user in the user interface, and displaying an initial interface according to a recognition result, where the initial interface includes the multiple action indicator icons displayed at the predetermined positions.

According to one or more embodiments of the present disclosure, the interaction apparatus further includes:
  a limb recognition prompting module, configured to display corresponding prompt information to the user in the user interface if the specific limb of the user is not recognized in the user interface.

According to one or more embodiments of the present disclosure, the interacting module is specifically configured to:
  average all matching results after each time of highlighting of the at least one action indicator icon to obtain the interaction completion degree of the user.

According to one or more embodiments of the present disclosure, an electronic device is provided, which includes:
one or more processors;
a memory for storing one or more programs;
where the one or more processors is enabled to implement the interaction method described in any embodiment of the present disclosure when the one or more programs are executed by the one or more processors.

According to one or more embodiments of the present disclosure, a computer-readable storage medium is provided, where the computer-readable storage medium has a computer program stored thereon, where when the computer program is executed by a processor, the interaction method described in any embodiment of the present disclosure is implemented.

According to one or more embodiments of the present disclosure, a computer program product which includes a computer program is provided, where the computer program is stored in a readable storage medium, and one or more processors of the electronic device may read the computer program from the readable storage medium, the computer program is executed by the one or more processors to enable the electronic device to execute the method provided by any of the above embodiments.

According to one or more embodiments of the present disclosure, a computer program is provided, where the computer program is stored in a readable storage medium, and one or more processors of the electronic device may read the computer program from the readable storage medium, the computer program is executed by the one or more processors to enable the electronic device to execute the method provided by any of the above embodiments.

The above descriptions are merely preferred embodiments of the present disclosure and illustrations of an applied technical principle. The person skilled in the art should understand that a disclosure scope involved in the present disclosure is not limited to the technical solution formed by the specific combination of the above-mentioned technical features, and should also cover other technical solutions formed by any combination of the above technical features or their equivalents without departing from the above disclosure concept. For example, a technical solution formed by replacing the above features with the technical features with similar functions disclosed in the present disclosure (but not limited to).

In addition, although operations are depicted in a particular order, it should not be understood as requiring these operations to be performed in the specific order shown or in the sequential order. Under a certain circumstance, multi-tasking and parallel processing may be advantageous. Likewise, although the above discussion contains several implementation-specific details, these should not be interpreted as limiting the scope of the present disclosure. Certain features described in the context of individual embodiments may also be implemented in combination in a single embodiment. Conversely, various features described in the context of a single embodiment may also be implemented in multiple embodiments individually or in any suitable sub-combination.

Although the subject matter has been described in a language specific to a structural feature and/or a methodological action, it should be understood that the subject matter defined in the appended claims is not necessarily limited to the specific features or actions described above. On the contrary, the specific feature and action described above are merely exemplary forms for implementing the claims.

What is claimed is:

1. An interaction method, comprising:
recognizing a specific limb of a user in a user interface, and displaying an initial interface according to a recognition result, wherein the initial interface comprises multiple action indicator icons displayed at predetermined positions;
playing first music;
highlighting at least one action indicator icon among the multiple action indicator icons displayed at the predetermined positions on the user interface according to a target music beat in the first music;
acquiring a limb action performed by the user;
determining whether the limb action performed by the user matches an icon feature of the highlighted at least one action indicator icon; and
determining an interaction completion degree of the user according to a determined final matching result after the playing of the first music is finished.

2. The method according to claim 1, wherein the highlighting the at least one action indicator icon among the multiple action indicator icons displayed at the predetermined positions on the user interface according to the target music beat in the first music comprises:
highlighting the at least one action indicator icon according to a music attribute of the first music and a position correlation of the multiple action indicator icons displayed at the predetermined positions on the user interface.

3. The method according to claim 1, wherein the determining whether the limb action performed by the user matches the icon feature of the highlighted at least one action indicator icon comprises:
detecting, within a preset highlight period, whether the specific limb of the user is located in a pre-display area of the highlighted at least one action indicator icon; and
determining whether the limb action performed by the user matches the icon feature indicated by the highlighted at least one action indicator icon according to a detection result.

4. The method according to claim 3, wherein the detecting, within the preset highlight period, whether the specific limb of the user is located in the pre-display area of the highlighted at least one action indicator icon comprises:
collecting a limb action image of the user in real time within the preset highlight period; and
judging whether the specific limb of the user is located in the pre-display area of the highlighted at least one action indicator icon according to the limb action image.

5. The method according to claim 1, wherein the determining whether the limb action performed by the user matches the icon feature of the highlighted at least one action indicator icon comprises:
matching the limb action performed by the user with an action identified from the highlighted at least one action indicator icon to determine whether the limb action performed by the user matches the icon feature of the highlighted at least one action indicator icon.

6. The method according to claim 1, further comprising:
controlling a flicker frequency of the highlighted at least one action indicator icon according to a playing rhythm of the first music within a preset highlight period.

7. The method according to claim 1, further comprising:
displaying corresponding prompt information to the user in the user interface if the specific limb of the user is not recognized in the user interface.

8. The method according to claim 1, wherein the determining the interaction completion degree of the user according to the determined final matching result after the playing of the first music is finished comprises:
averaging all matching results after each time of highlighting of the at least one action indicator icon to obtain the interaction completion degree of the user.

9. An electronic device, comprising:
one or more processors; and
a memory for storing one or more programs,
wherein when the one or more programs are executed by the one or more processors, the one or more processors are enabled to:
recognize a specific limb of a user in a user interface, and display an initial interface according to a recognition result, wherein the initial interface comprises multiple action indicator icons displayed at predetermined positions;
play first music;
highlight at least one action indicator icon among the multiple action indicator icons displayed at the predetermined positions on the user interface according to a target music beat in the first music;
acquire a limb action performed by the user;
determine whether the limb action performed by the user matches an icon feature of the highlighted at least one action indicator icon; and
determine an interaction completion degree of the user according to a determined final matching result after the playing of the first music is finished.

10. The electronic device according to claim 9, wherein the one or more processors are further enabled to:
highlight the at least one action indicator icon according to a music attribute of the first music and a position correlation of the multiple action indicator icons displayed at the predetermined positions on the user interface.

11. The electronic device according to claim 9, wherein the one or more processors are further enabled to:
detect whether the specific limb of the user is located in a pre-display area of the highlighted at least one action indicator icon within a preset highlight period; and
determine whether the limb action performed by the user matches the icon feature indicated by the highlighted at least one action indicator icon according to a detection result.

12. The electronic device according to claim 11, wherein the one or more processors are further enabled to:
collect a limb action image of the user in real time within the preset highlight period; and
judge whether the specific limb of the user is located in the pre-display area of the highlighted at least one action indicator icon according to the limb action image.

13. The electronic device according to claim 9, wherein the one or more processors are further enabled to:
match the limb action performed by the user with an action identified from the highlighted at least one action indicator icon to determine whether the limb action performed by the user matches the icon feature of the highlighted at least one action indicator icon.

14. The electronic device according to claim 9, wherein the one or more processors are further enabled to:
control a flicker frequency of the highlighted at least one action indicator icon according to a playing rhythm of the first music within a preset highlight period.

15. The electronic device according to claim 9, wherein the one or more processors are further enabled to:
display corresponding prompt information to the user in the user interface if the specific limb of the user is not recognized in the user interface.

16. The electronic device according to claim 9, wherein the one or more processors are further enabled to:
average all matching results after each time of highlighting of the at least one action indicator icon to obtain the interaction completion degree of the user.

17. A non-transitory computer-readable storage medium having a computer program stored thereon, wherein when the computer program is executed by a processor, the processor is enabled to:
recognize a specific limb of a user in a user interface, and display an initial interface according to a recognition result, wherein the initial interface comprises multiple action indicator icons displayed at predetermined positions;
play first music;
highlight at least one action indicator icon among the multiple action indicator icons displayed at the predetermined positions on the user interface according to a target music beat in the first music;
acquire a limb action performed by the user;
determine whether the limb action performed by the user matches an icon feature of the highlighted at least one action indicator icon; and
determine an interaction completion degree of the user according to a determined final matching result after the playing of the first music is finished.

18. The non-transitory computer-readable storage medium according to claim 17, wherein the processor is further enabled to:
highlight the at least one action indicator icon according to a music attribute of the first music and a position correlation of the multiple action indicator icons displayed at the predetermined positions on the user interface.

* * * * *